United States Patent
Manchanda et al.

(10) Patent No.: US 10,098,039 B1
(45) Date of Patent: Oct. 9, 2018

(54) ADJUSTING PACKET DROP-TIMER BASED ON A SERVED UE BEING A RELAY-UE

(71) Applicant: Sprint Spectrum L.P., Overland Park, KS (US)

(72) Inventors: Nitesh Manchanda, Overland Park, KS (US); Vanil Parihar, Overland Park, KS (US); Sreekar Marupaduga, Overland Park, KS (US); Ryan P. Dreiling, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 169 days.

(21) Appl. No.: 15/163,852

(22) Filed: May 25, 2016

(51) Int. Cl.
*H04W 28/02* (2009.01)
*H04W 40/22* (2009.01)
*H04W 8/02* (2009.01)
*H04W 28/14* (2009.01)

(52) U.S. Cl.
CPC .............. *H04W 28/14* (2013.01); *H04W 8/02* (2013.01); *H04W 28/0205* (2013.01); *H04W 40/22* (2013.01)

(58) Field of Classification Search
None
See application file for complete search history.

(56) References Cited

U.S. PATENT DOCUMENTS

| | | | | |
|---|---|---|---|---|
| 2015/0043435 A1* | 2/2015 | Blankenship | ......... | H04L 69/322 370/329 |
| 2015/0271838 A1* | 9/2015 | Szilagyi | ............ | H04W 72/1205 370/336 |
| 2016/0164793 A1* | 6/2016 | Basu Mallick | ....... | H04W 28/06 370/235 |

\* cited by examiner

*Primary Examiner* — Christopher Crutchfield
*Assistant Examiner* — Alan Lindenbaum (57) ABSTRACT

Disclosed are methods and systems for setting a timeout period. In particular, a BS may have data storage defining a buffer. Also, the BS may be configured to (i) provide an air interface through which the BS serves UEs, (ii) buffer data packets destined to individual UEs, and (iii) apply a buffer timeout process according to which the BS drops a data packet from the buffer in response to that data packet being in the buffer for a timeout period. As such, the BS may make a determination that a served UE is a relay-UE that provides wireless backhaul connectivity for a relay-BS, and may set the timeout period based on the determination. When the BS then applies the buffer timeout process, the BS drops a data packet from the buffer in response to that data packet being in the buffer for the timeout period set based on the determination.

15 Claims, 4 Drawing Sheets

ADJUSTING PACKET DROP-TIMER BASED ON A SERVED UE BEING A RELAY-UE

BACKGROUND

Unless otherwise indicated herein, the description provided in this section is not itself prior art to the claims and is not admitted to be prior art by inclusion in this section.

A typical cellular wireless network includes a number of base stations (BSs) each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station (BS) may be coupled with network infrastructure that provides connectivity with one or more transport networks, such as the public switched telephone network (PSTN) and/or the Internet for instance. With this arrangement, a UE within coverage of the network may engage in air interface communication with a BS and may thereby communicate via the BS with various remote network entities or with other UEs served by the BS.

Further, a cellular wireless network may operate in accordance with a particular air interface protocol (radio access technology), with communications from the BSs to UEs defining a downlink or forward link and communications from the UEs to the BSs defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with the air interface protocol, each coverage area provided by the BS may operate on one or more radio frequency channels each spanning a range of frequency spectrum, and the air interface may be divided over time into a continuum of transmission time units, such as frames, subframes, timeslots, symbol durations, and the like, in which communications may pass on a downlink from the BS to the UEs and on an uplink from the UEs to the BS using a designated modulated and encoding scheme. Such carriers may be frequency division duplex (FDD), in which the downlink and uplink channels are defined as separate respective ranges of frequency, or time division duplex (TDD), in which the downlink and uplink channels are defined on a common range of frequency but are distinguished from each other through time division multiplexing. Further, the downlink and uplink channels may then define various sub-channels for carrying particular communications, such a control signaling and bearer data (e.g., user communications) between the BS and served UEs.

As UEs enter into coverage of the BS, the BS may become configured with connections to serve those UEs. For instance, for each such UE entering coverage on a particular carrier, the BS may engage in signaling with the network infrastructure to establish a bearer connection for carrying data between a gateway system and the BS, and the BS may work with the UE to establish a radio-link-layer connection for carrying data over the air between the BS and the UE on the carrier. Once so configured, the BS may then serve the UEs. For instance, when data arrives over the transport network for transmission to a UE, the gateway system may transmit the data over the UE's bearer connection to the BS, and the BS may then transmit the data over the UE's radio-link-layer connection to the UE.

In such a wireless communication system, the BS may manage the transmission of data on the downlink and uplink in the defined transmission time units and in particular resources, such as particular subcarriers defined in those transmission time units. For instance, as the BS receives data destined to particular UEs, the BS may schedule downlink transmission of that data to occur in particular transmission time units and may transmit the data over the air to the UEs in the scheduled transmission time units. Similarly, as UEs have data to send to the BS, the UEs may send scheduling requests to the BS, the BS may then schedule uplink transmission of that data to occur in particular transmission time units, and the UEs may then transmit the data over the air to the BS in the scheduled transmission time units.

Each carrier on which a BS provides service will have a limited supply of resources on which to transmit data to served UEs. For instance, each carrier will have a limited frequency bandwidth. Further, depending on the air interface protocol, only certain portions of a carrier's frequency bandwidth and/or certain segments of time may be designated for use to carry data to served UEs. Other resource limitations may be possible as well.

In order to help manage data transmission resources given these limitations, the BS may be configured to impose a per-UE data transmission rate cap. When applying such a rate cap on a carrier, as the BS receives data packets for transmission to a UE on the carrier, the BS may limit its rate of transmission of that data to be no greater than the rate cap and may buffer any excess data (i.e., data exceeding the rate cap) destined to the UE. For this purpose, the BS may establish and maintain in physical data storage a respective data buffer for each such UE, with each such data buffer being statically or dynamically sized. Further, the BS may be configured to apply a buffer timeout process according to which the BS drops a data packet from the buffer (e.g., deletes or reroutes the packet) in response to the data packet being in the buffer for a timeout period. By dropping data packets in this manner, the BS can manage the data load of a respective data buffer, so as to avoid overloading that data buffer for example.

In a further aspect, BSs in a cellular wireless network can be physically arranged in various ways. For instance, BSs may be co-located with each other by having their antenna structures at largely the same geographic location (within a defined tolerance, for instance). By way of example, a single cell site could be arranged to define two BSs with separate antenna structures on a common antenna tower or other base structure. And in another example, a single physical BS that provides service separately on first and second carriers could be considered to define the two separate BSs, one operating on the first carrier and the other operating on the second carrier. Alternatively, BSs in a cellular wireless network can be distributed at some distance from each other. In particular, the antenna structure of a given BS may be located at a geographic location that is at some non-zero distance from the antenna structure of another BS.

With these arrangements, the BSs of a wireless service provider's network would ideally provide seamless coverage throughout a market area, so that UEs being served by the system could move from coverage area to coverage area without losing connectivity. In practice, however, it may not be possible to operate a sufficient number of BSs or to position the BSs in locations necessary to provide seamless coverage. As a result, there may be holes in coverage.

One way to help to resolve this problem is to operate a relay node (RN) that effectively extends the range of a BS's coverage area so as to partially or completely fill a coverage hole. Such an RN may be configured with a wireless backhaul interface for communicating with and being served by the BS, referred to as a "donor BS," and may also be configured with a wireless access interface for communicating with and serving one or more end-user UEs, such as a cell phone, wirelessly equipped computer, tablet, and/or other device that is not set to provide wireless backhaul connectivity. For example, the RN could include a relay base station (relay-BS) that serves end-user UEs and could also include a relay-UE that is served by the donor BS and thus provides wireless backhaul connectivity for the relay-BS. In practice, the relay-BS and relay-UE could be integrated together as a single RN device or could be provided as separate devices communicatively linked together.

In this arrangement, the BS is considered to be a donor BS, in that the BS provides coverage to the relay-UE, and the relay-B S then provides coverage to one or more end-user UEs. Also, the wireless communication link between the donor BS and the relay-UE is considered to be a "relay backhaul link," and the wireless communication link between the relay-BS and UEs served by the relay-BS is considered to be a "relay access link." Further, to the extent the donor BS itself also serves end-user UEs, the wireless communication link between the donor BS and those UEs is considered to be a "donor access link."

Given these arrangements, a donor BS may receive from the network data packets destined to the relay-UE and perhaps ultimately destined to one or more of the end-user UEs being served by the relay-BS (referred to herein as RN-served UEs). In particular, a data packet may include (e.g., in a header of the data packet) a network address of the relay-UE and/or of the RN-served UE destined to receive the data packet. In this way, a donor BS and/or other network entity could read the network address from the data packet and based on that network address may determine that the data packet is destined to the relay-UE and perhaps ultimately to the RN-served UE. As such, when a data packet arrives over the transport network for transmission to the relay-UE or to an RN-served UE, the gateway system may transmit the data packet to the donor BS over the relay-UE's or the RN-served UE's bearer connection. Then, the donor BS may transmit the data packet over a wireless backhaul connection to the relay-UE. Moreover, the relay-BS may receive the data packet from the relay-UE and may then transmit the data packet to the RN-served UE if that data packet is destined to that RN-served UE.

In practice, data packets destined to RN-served UEs may include various types of communications. Generally, such communications could be categorized into control signaling traffic and bearer data communications. In particular, control signaling traffic may help manage service of RN-served UEs, and could thus include bearer setup signaling, tracking area update signaling, and/or handover signaling, among others. Whereas, a bearer data communication may encompass user data, such as voice data, text data, video data, and/or web data, among others.

OVERVIEW

When a donor BS prepares for serving a relay-UE and/or when the donor BS is already serving the relay-UE over a relay backhaul link, the donor BS may buffer one or more data packets destined to the relay-UE, and at least some of those buffered data packets may be ultimately destined to one or more of the RN-served UEs. In applying a buffer timeout process as discussed above, however, the donor BS may end up dropping one or more data packets destined to one or more of the RN-served UEs and, as a result, an RN-served UE may end up not receiving these dropped packets. Moreover, if such dropped packets include control signaling traffic and/or bearer data, then the RN-served UE may not receive that control signaling traffic and/or bearer data, and thus may experience problems.

As an example, a UE may seek to be served by the RN, and the donor BS may drop data packets including bearer setup signaling being sent to that UE to help set up for the UE a bearer connection between a gateway system and the relay-BS of the RN. As a result, the network may not be able to properly set up the bearer connection for the UE, and the UE may thus not be able to receive subsequent data packets destined to the UE via the RN, such as data packets including bearer data or the like. And as another example, the donor BS may drop data packets including bearer data destined to an RN-served UE, and thus that RN-served UE may not receive the bearer data itself. Moreover, if that bearer data includes voice data, for instance, the RN-served UE may not receive that voice data and may thus experience a dropped voice call and/or experience interruptions during an ongoing voice call, among other possibilities.

Disclosed herein are methods and systems to help minimize the likelihood of dropping data packets destined to RN-served UEs via a relay-UE, so as to help minimize the likelihood of RN-served UEs experiencing problems that may result from dropping of such data packets. In accordance with the disclosure, a donor BS will make a determination that a UE being served by the donor BS is in fact a relay-UE rather than an end-user UE. Once the donor BS makes that determination, the donor BS will then use that determination as basis for setting a timeout period for data packets destined to the relay-UE, which may involve increasing duration of that timeout period for instance. Consequently, a rate at which data packets destined to the relay-UE are being dropped may decrease, thereby increasing the likelihood that these data packets will be received by the relay-UE and thus that any such packets ultimately destined to RN-served UEs are received by those RN-served UEs.

Accordingly, in one respect, disclosed is method operable in a BS. The BS may have a data storage that defines a buffer and may be configured (i) to provide an air interface through which the BS serves one or more UEs, (ii) to buffer in the data storage data packets destined to individual UEs of the one or more UEs, and (iii) to apply a buffer timeout process according to which the BS drops at least one data packet from the buffer in response to the at least one data packet being in the buffer for a timeout period. In accordance with the method, the BS may make a determination that a served UE is a relay-UE that provides wireless backhaul connectivity for a relay-BS. And the BS may then set the timeout period based on the determination. In this way, when the BS then applies the buffer timeout process, the BS may drop at least one data packet from the buffer in response to the at least one data packet being in the buffer for the timeout period set based on the determination that the served UE is a relay-UE that provides wireless backhaul connectivity for a relay-BS.

In another respect, disclosed is a BS. The BS may include an antenna structure configured to provide an air interface through which the BS serves one or more UEs. Additionally, the BS may include a data storage that defines a buffer. Further, the BS may include a controller configured (i) to buffer in the data storage data packets destined to individual UEs of the one or more UEs and (ii) to apply a buffer timeout process according to which the controller drops at least one data packet from the buffer in response to the at least one data packet being in the buffer for a timeout period. With this arrangement, the controller may be further configured to make a determination that a served UE is a relay-UE that provides wireless backhaul connectivity for a relay-BS. Additionally, the controller may be further configured to set the timeout period based on the determination. In this way, when the controller then applies the buffer timeout process, the controller may drop at least one data packet from the buffer in response to the at least one data packet being in the buffer for the timeout period set based on the determination that the served UE is a relay-UE that provides wireless backhaul connectivity for a relay-B S.

Still further, in another respect, disclosed is a non-transitory computer-readable medium having stored thereon instructions executable by a processor to cause a BS to carry out functions such as those noted above, to facilitate adjustment of a timeout period.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
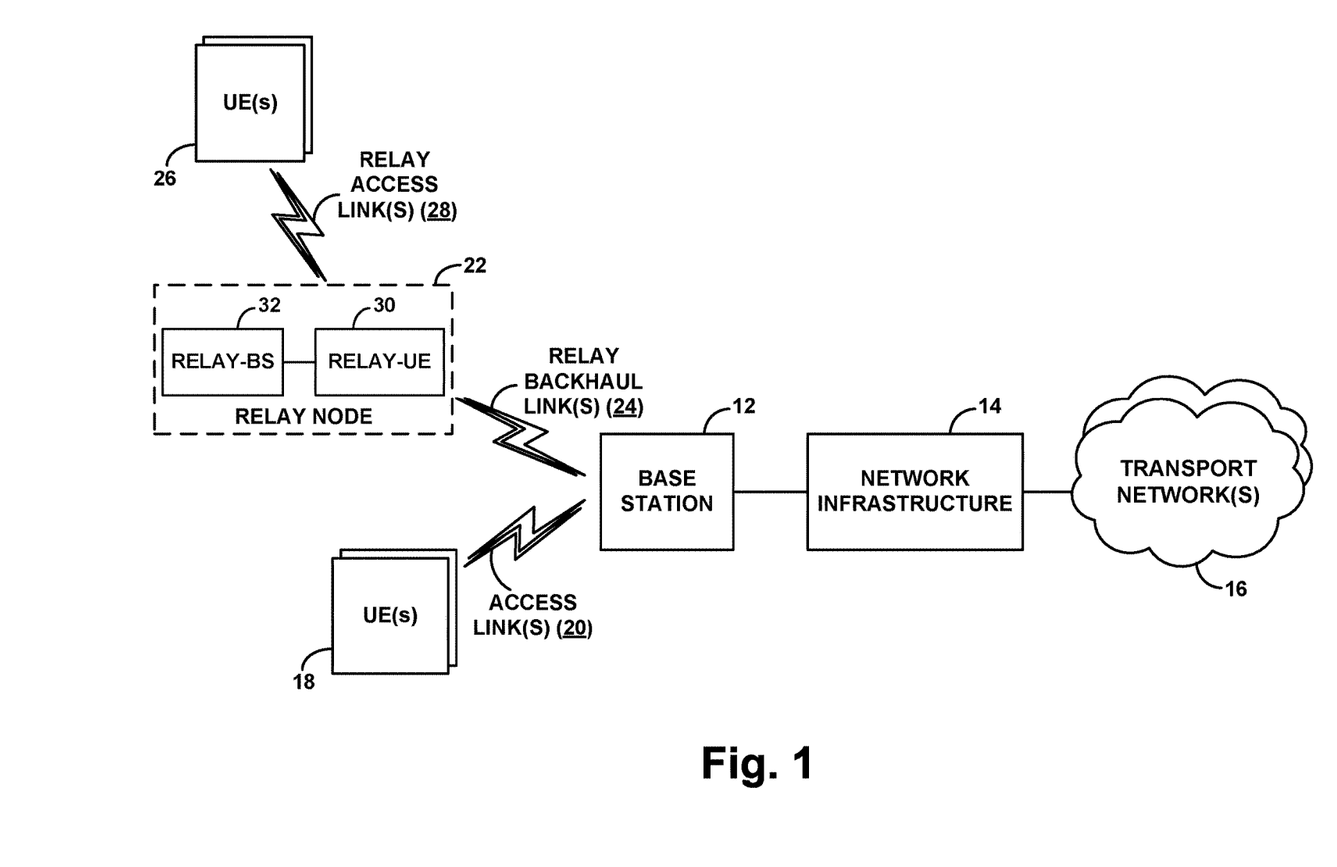
FIG. 1 is a simplified block diagram of a wireless communication system in which the present method can be implemented.

Referring to the drawings, as noted above, FIG. 1 is a simplified block diagram of an example communication system in which the present method can be implemented. The illustrated communication system includes a representative BS 12 interconnected with network infrastructure 14, such as a switch and/or gateway, providing connectivity with one or more transport networks 16 such as the PSTN and/or the Internet. The BS 12 may be configured to serve one or more RNs and could thus be referred to as a donor BS once the BS begins to serve one or more such RNs. FIG. 1 illustrates that the BS 12 may serve one or more end-user UEs 18 respectively over one or more access links 20 and may also serve an RN 22 over one or more relay backhaul links 24. Further, FIG. 1 illustrates that the RN 22 may then itself serve one or more end-user UEs 26 respectively over one or more relay access links 28.

In the example arrangement of FIG. 1, the RN 22 is shown as including a relay-UE 30 and a relay-BS 32. In practice, the relay-UE 30 may be served by the donor BS 12 and may thus provide wireless backhaul connectivity for the relay-BS 32 via the one or more relay backhaul links 24. Further, the relay-BS 32 could then serve one or more end-user UEs 26 via one or more relay access links 28. In this arrangement, the relay-UE 30 and relay-BS 32 could be integrated together as a single RN device or could be provided as separate devices communicatively linked together (e.g., via a local area network or other connection).

Through this communication system, each of the one or more UEs 18 may thus engage in communication on the transport network(s) 16 via at least one of the access links 20, the BS 12, and the network infrastructure 14. Also, each of the one or more UEs 26 may engage in communication on the transport network(s) 16 via at least one of the relay access links 28, the RN 22, at least one of the relay backhaul links 24, the BS 12, and the network infrastructure 14. Moreover, the BS 12 (and/or the RN 22) may be licensed or otherwise arranged to engage in wireless communications using one or more carriers each defining a particular frequency or range of frequencies.

Given this arrangement, when a UE (e.g., the relay-UE 30 or one of the UEs 18) enters into coverage of BS 12, the UE may detect the BS's coverage on a particular carrier, and the UE and the BS 12 may then engage in an attach process or handover process to register the UE with the network on that carrier. For instance, the BS 12 and the UE may engage in radio resource control (RRC) signaling to establish on the carrier an RRC connection defining a radio-link-layer connection between the UE and the BS 12. Further, the UE may transmit to the BS 12 an attach request, which the BS 12 may pass along to the network infrastructure 14 (e.g., to a mobility management entity (MME)), triggering a process of authenticating the UE and establishing one or more bearer connections for the UE between the BS 12 and the network infrastructure 14, among other operations. Moreover, through this process, the BS 12, the network infrastructure 14, and/or the UE may each store a context record indicating that the BS 12 is serving the UE at issue on that carrier and perhaps also indicating other information.

Furthermore, the BS 12 and/or other network entity may use one of various approaches to distinguish relay-UEs (e.g., relay-UE 30) from conventional end-user UEs (e.g., UE(s) 18), so as to facilitate treating relay-UEs differently than conventional end-user UEs. By way of example, a relay-UE may have a special identifier or be served by the network under a special network identifier (e.g., a special public land mobile network (PLMN) identifier, or special packet data network (PDN) connection identifier), indicating that the relay-UE will be operating as a relay-UE. Whereas, a conventional end-user UE may have an identifier or be served by the network under an identifier that does not indicate the UE will be operating as a relay-UE and thus that may establish the UE is not a relay-UE. Thus, when a UE attaches with the network, such as with the BS 12, the network (e.g., the BS 12 and/or other network entity) may determine whether the UE is a relay-UE or not and do so based on such identification or other information provided by the UE during attachment or noted in a network profile record (e.g., context record) for the UE. Other approaches are possible as well.

As noted above, when the BS 12 serves one or more UEs, the BS 12 may have a limited extent of air interface resources to assign to those UEs, and thus the BS 12 may buffer at least some downlink data packets. The act of buffering downlink data packets may help the BS 12 schedule downlink transmissions among multiple served UEs, allowing prioritization of transmissions and/or support for other management of downlink air interface resources, among other functions.

More specifically, as discussed above, given the limited extent of assignable air interface resources, the BS 12 may be configured to impose a per-UE data transmission rate cap. When applying such a rate cap, as the BS 12 receives data packets for transmission to a UE, the BS 12 may limit its rate of transmission of that data to be no greater than the rate cap and may buffer any excess data destined to the UE. For this purpose, the BS 12 may establish and maintain in physical data storage a respective data buffer for each such UE. With this arrangement, the BS 12 could buffer a data packet destined to a UE in a buffer that the BS 12 respectively maintains for that UE, and the BS 12 could then transmit that buffered data packet to the UE at a time that the BS 12 schedules for transmission of the data packet.

As further noted above, however, in some situations the BS 12 may end up dropping a data packet from a buffer, and thus not transmitting the packet, if the data packet has been in the buffer for some extent of time. In particular, as noted, the BS 12 may be configured to apply a buffer timeout process according to which the BS 12 drops a data packet from a buffer in response to the data packet being in the buffer for a timeout period. In practice, the BS 12 could set a timeout period specifically for each buffer, so that a data packet is dropped from a buffer after being in that buffer for a respectively set timeout period. In a specific example, once the BS 12 adds a data packet to a buffer, the BS 12 may initiate for that data packet a timer that is set to run for a particular timeout period specific to that buffer and, if that timer expires before the data packet is transmitted, the BS 12 may responsively drop that data packet. In practice, the BS 12 dropping a data packet may involve the BS 12 deleting the data packet from the buffer, the BS 12 rerouting the data packet, and/or the BS 12 simply not transmitting the data packet, among others.

With this arrangement, the timeout period that the BS 12 sets for a certain buffer may directly affect the likelihood of a data packet being dropped and thus the extent of data packets dropped from that buffer. In particular, given a statically sized buffer and a static transmission rate cap, if the BS 12 sets a longer timeout period for a buffer, then a data packet may remain in that buffer for a longer duration without being dropped than the packet would remain in the buffer if the BS 12 sets a shorter timeout period for that buffer. As such, increasing the duration of the timeout period may increase the likelihood of the data packet's scheduled transmission time arriving before the timeout period has passed, and thus increasing the likelihood of that data packet being transmitted without being dropped. In this manner, a longer timeout period set for a buffer could potentially result in a lower extent of data packets being dropped from that buffer. As such, at issue is then what timeout period the BS 12 should set for each of the various UEs that the BS 12 may serve.

As noted above, the present disclosure provides methods and systems for adjusting or otherwise setting a timeout period for buffering data packets. In accordance with the disclosure, the BS 12 may make a determination that a served UE is a relay-UE (e.g., relay-UE 30) rather than an end-user UE (e.g., one of the UE(s) 18). Then, the BS 12 may set a timeout period based on that determination, so that, once the BS 12 then carries out the buffer timeout process, the BS 12 may drop a data packet from a buffer (e.g., a buffer maintained for the relay-UE 30) in response to that data packet being in the buffer for the timeout period set based on the determination that the served UE is a relay-UE. In practice, the BS 12 may be configured to carry out these acts of making the determination and/or of setting the timeout period at any feasible time, such as during an attach process or handover process used to register a UE with the network and/or while the BS 12 is already serving a UE, among other possibilities.

Moreover, the determination that a served UE is a relay-UE may in fact be a determination that the served UE is an RN or vice versa. In particular, a "relay-UE" may not necessarily be a component or a device within an RN and could instead simply represent a functional aspect of an RN that a BS 12 may serve, with that functional aspect being the wireless backhaul connectivity provided by the RN, among others. As such, the various aspects of the present disclosure may apply in the context of the determination being that a served UE is an RN. For simplicity, however, the present disclosure is described in the context of determination being that a served UE is a relay-UE. Nonetheless, the BS 12 may determine in various ways that a served UE is a relay-UE.

For instance, the BS 12 may use the above-described approach to distinguish relay-UEs from conventional end-user UEs. In particular, as noted, the BS 12 may determine whether a UE is a relay-UE based on an identifier, such as a PLMN identifier for instance. In a more specific example, the BS 12 may use a PLMN identifier (e.g., indicated in a stored context record for the UE) to determine the PLMN to which the served UE subscribes. And based on that determined PLMN, the BS 12 may then determine whether the served UE is a relay-UE or rather an end-user UE. Other examples are also possible.

Once the BS 12 makes a determination that a served UE is a relay-UE, the BS 12 may then set based on that determination a timeout period that the BS 12 will apply specifically for data packets buffered for transmission to the served UE. In particular, the BS 12 may be configured to increase a timeout period for a UE that is determined to be a relay-UE and thus may end up setting a longer timeout period for a UE that is determined to be a relay-UE than for a UE that is determined to be an end-user UE. As a result of increasing the timeout period for the relay-UE (e.g., relay-UE 30), a rate at which data packets destined to the relay-UE are being dropped may decrease compared to a rate at which data packets destined to an end-user UE may be dropped. In this way, increasing the timeout period for the relay-UE may increase the likelihood of one or more RN-served UEs (e.g., one or more of the UE(s) 26) receiving one or more data packets that are destined to those RN-served UEs. In this manner, this process may help eliminate or at least reduce problems experienced by RN-served UEs as a result of data packets being dropped.

After the BS 12 sets the timeout period for the relay-UE based on the determination that the served UE is in fact a relay-UE rather than an end-user UE, the BS may then apply the set timeout period specifically for data packets buffered for transmission to the served relay-UE, and the BS 12 may do so in various ways. By way of example, the BS 12 may maintain a buffer for the relay-UE 30 and may set a timeout period for that buffer based on the above-mentioned determination. In this example, once the BS 12 determines that a data packet is destined to the relay-UE 30 (and possibly ultimately to an RN-served UE 26), the BS 12 may programmatically map the data packet to a timer arranged to run for the set timeout period. Also, the BS 12 perhaps could initiate that timer upon adding that data packet to the respective buffer. In this way, the BS 12 may detect expiration of the timer at the end of the set timeout period and may responsively drop from the buffer the data packet destined to the relay-UE 30. Other examples are possible as well.

In an example implementation, the act of setting the timeout period may take various forms. In one example, the BS 12 may be configured (e.g., via manual engineering input) to simply set a timeout period of a first duration for data packets destined to end-user UEs and to set a timeout period of a second duration for data packets destined to relay-UEs, with the second duration being longer than the first duration. As further discussed below, the BS 12 may further adjust such durations based on additional factors. In another example, the BS 12 may be configured (e.g., via manual engineering input) to set a default timeout period for a UE before the BS 12 determines whether the UE is a relay-UE or an end-user UE. In particular, the BS 12 may set such a default timeout period for a UE at a time when the BS 12 begins to arrange service for the UE, among other possibilities. In this example, however, once the BS 12 determines that a served UE is a relay-UE, the BS 12 may then responsively increase the duration of the timeout period for data packets destined to that relay-UE. In practice, the specific duration by which that timeout period is increased may be a predetermined duration or a predetermined percentage, among other options. Alternatively, the specific duration by which that timeout period is increased may also be based on additional factors as further disclosed below. Other examples are also possible.

In a further aspect, the BS 12 may also consider additional factors when setting or otherwise adjusting the timeout period. Specifically, the BS 12 may consider these additional factors in additional to the above-described determination of a served UE being a relay-UE. Moreover, with or without consideration of these additional factors, the BS 12 may still end up applying a longer timeout period for data packets destined to relay-UEs than for data packets destined to end-user UEs.

Without limitation, the additional factors may include an extent of traffic being transmitted from the BS to the relay-UE, a type of traffic being transmitted from the BS to the relay-UE, and/or a count of UEs being served by an RN (e.g., by a relay-BS for which the relay-UE provides wireless backhaul connectivity). As such, the BS 12 may sometimes use one or more these factors along with the above-described determination as basis for setting the timeout period. Also, after setting the timeout period, the BS 12 could dynamically adjust the timeout period from time to time (e.g., continuously or periodically) based on the BS 12 determining a change in one or more of these factors (e.g., a change in the extent of traffic). Further, the BS 12 could apply a respective weight to each factor as part of the process of setting the timeout period and/or as part of the process of determining an adjustment to the timeout period.

In one case, the BS 12 may be configured to determine an extent of traffic being transmitted from the BS 12 to the relay-UE 30 and may be configured to set the timeout period further based on that determined extent of traffic. In practice, the BS 12 may determine the extent of traffic in various ways. For instance, the BS 12 may determine an extent of air interface resources that the BS 12 scheduled for use to transmit data to the relay-UE 30 over a certain period of time. As such, the BS 12 may use this determined extent of resources as basis for adjusting or otherwise setting the timeout period.

By way of example, the BS 12 may have stored thereon or may otherwise refer to mapping data that maps each of various extents of traffic with a respective adjustment (e.g., an increase or a decrease) to the timeout period. In practice, that respective adjustment could be a respective predetermined duration by which the timeout period is to be adjusted or could be a respective percentage by which the timeout period is to be adjusted, among other possibilities. With this arrangement, the BS 12 may make a further determination that the mapping data maps the determined extent of traffic with a particular duration (e.g., a predetermined duration or a particular percentage) by which the timeout period is to be adjusted. And based on that further determination, the BS 12 may then adjust the timeout period by the particular duration.

Moreover, the mapping data may be arranged such that, as the determined extent of traffic increases, the mapped respective duration also increases. In particular, when the extent of traffic transmitted to a relay-UE increases, the extent of buffered data packets destined to that relay-UE may also increase, which may further result in an increase in the extent of data packets dropped from the buffer that the BS 12 maintains for that relay-UE. Hence, the mapping data may be arranged so that an increase in the extent of traffic results in an increase of the timeout period, thereby potentially reducing the likelihood of a data packet destined to the relay-UE being dropped and thus perhaps also reducing (or at least maintaining) the overall extent of data packets being dropped from the buffer.

For instance, the mapping data may map a first extent of traffic with a first duration, so that the BS 12 adjusts the timeout period by that first duration if the determined extent of traffic is that first extent. Additionally, the mapping data may map a second extent of traffic with a second duration, so that the BS 12 adjusts the timeout period by that second duration if the determined extent of traffic is that second extent. In this instance, assuming that the second extent is larger than the first extent, the mapping data may be arranged so that the second duration is longer than the first duration. For example, the first extent of traffic may involve transmission fifty megabytes of data and the second extent of traffic may involve transmission of one hundred megabytes of data. In this example, the mapping data may be arranged so that the first duration involves an increase of the timeout period by five percent and the second duration involves an increase of the timeout period by ten percent. Other examples are also possible.

In another case, the BS 12 may be configured to determine a type of traffic being transmitted from the BS 12 to relay-UE 30 and may be configured to set the timeout period further based on that determined type of traffic. In practice, the BS 12 may determine the type of traffic in various ways. For instance, a data packet may have a respective payload segment carrying some or all of the data and may also have a header. In some cases, the data carried in the payload segment of such packets may be a digitally encoded representation of particular type of traffic to be transmitted. Such traffic may itself be media content of some type, such as voice content, web content, gaming content, video content, e-mail content, or the like. Additionally or alternatively, an indicator (e.g., a differentiated services code point (DSCP)) may appear in a data packet's header and that indicator may be representative of the type of traffic carried by that packet. With this arrangement, the BS 12 may use various techniques (e.g., deep packet inspection (DPI)) to read the payload and/or header of one or more such packets to programmatically determine one or more types of traffic being carried by such packet(s). As such, the BS 12 may use the determined type(s) of traffic as basis for adjusting or otherwise setting the timeout period.

By way of example, the BS 12 may have stored thereon or may otherwise refer to mapping data that maps each of various types of traffic with a respective adjustment (e.g., an increase or a decrease) to the timeout period. In practice, that respective adjustment could be a respective predetermined duration by which the timeout period is to be adjusted or could be a respective percentage by which the timeout period is to be adjusted, among other possibilities. With this arrangement, the BS 12 may make a further determination that the mapping data maps the determined type of traffic with a particular duration (e.g., a predetermined duration or a particular percentage) by which the timeout period is to be adjusted. And based on that further determination, the BS 12 may adjust the timeout period by the particular duration.

Moreover, the mapping data may be arranged so that the timeout period is adjusted (e.g., increased) by higher respective durations when certain types of traffic are being transmitted as compared with the respective durations by which the timeout period is adjusted when other types of traffic are being transmitted. For instance, these certain types of traffic may be those having higher designated priority levels (e.g., higher than a threshold priority level) and/or those designated as latency-sensitive, interruption-sensitive, or the like. In more specific examples, these certain types of traffic may include voice traffic, gaming traffic, video traffic and/or control signaling traffic, among others. As such, the mapping data may be arranged so that a determination of such higher priority traffic (e.g., control signaling) being transmitted results in an increase of the timeout period, thereby potentially reducing the likelihood of a data packet carrying higher priority traffic being dropped and thus perhaps also reducing (or at least maintaining) the extent to which data packets that carry higher priority traffic are being dropped. Other examples are also possible.

In yet another case, the BS 12 may be configured to determine a count of RN-served UEs and may be configured to set the timeout period further based on that determined count. In practice, the BS 12 may determine the count of RN-served UEs in various ways. For example, the RN 22 may include a counter that indicates a count of UEs currently being served by the RN 22 (e.g., by the relay-BS 32 of the RN 22). In particular, each time that the RN 22 begins serving a UE (e.g., establishes a new RRC connection with the UE), the RN 22 may increment the counter by a value of 1 (one). And each time that the RN 22 stops serving a UE (e.g., releases the RRC connection with the UE), the RN 22 may decrement the counter by a value of 1. With this arrangement, the RN 22 may refer to the counter to determine the count of how many UEs are currently being served by the RN 22. And the RN 22 may from time to time (e.g., continuously or periodically) report the determined count to the BS 12. As such, the BS 12 may use the determined count as basis for adjusting or otherwise setting the timeout period. By way of example, the BS 12 may have stored thereon or may otherwise refer to mapping data that maps each of various counts of RN-served UE with a respective adjustment (e.g., an increase or a decrease) to the timeout period. In practice, that respective adjustment could be a respective predetermined duration by which the timeout period is to be adjusted or could be a respective percentage by which the timeout period is to be adjusted, among other possibilities. With this arrangement, the BS 12 may make a further determination that the mapping data maps the determined count with a particular duration (e.g., a predetermined duration or a particular percentage) by which the timeout period is to be adjusted. And based on that further determination, the BS 12 may adjust the timeout period by the particular duration.

Moreover, the mapping data may be arranged such that, as the determined count of RN-served UEs increases, the mapped respective duration also increases. In particular, when the count of RN-served UEs increases, the extent of buffered data packets may also increase, which may further result in an increase in the extent of data packets dropped from the buffer. Hence, the mapping data may be arranged so that an increase in the count of RN-served UEs results in an increase of the timeout period, thereby potentially reducing the likelihood of a data packet being dropped and thus perhaps also reducing (or at least maintaining) the extent of data packets being dropped.

For instance, the mapping data may map a first count of RN-served UEs with a first duration, so that the BS 12 adjusts the timeout period by that first duration if the determined count is that first count. Additionally, the mapping data may map a second count of RN-served UEs with a second duration, so that the BS 12 adjusts the timeout period by that second duration if the determined count is that second count. So assuming that the second count is higher than the first count, the mapping data may be arranged so that the second duration is longer than the first duration. For example, the first count may be five RN-served UEs and the second count may be seven RN-served UEs. In this example, the mapping data may be arranged so that the first duration involves an increase of the timeout period by ten percent and the second duration involves an increase of the timeout period by twelve percent. Other examples and cases are also possible.

Figure 2:
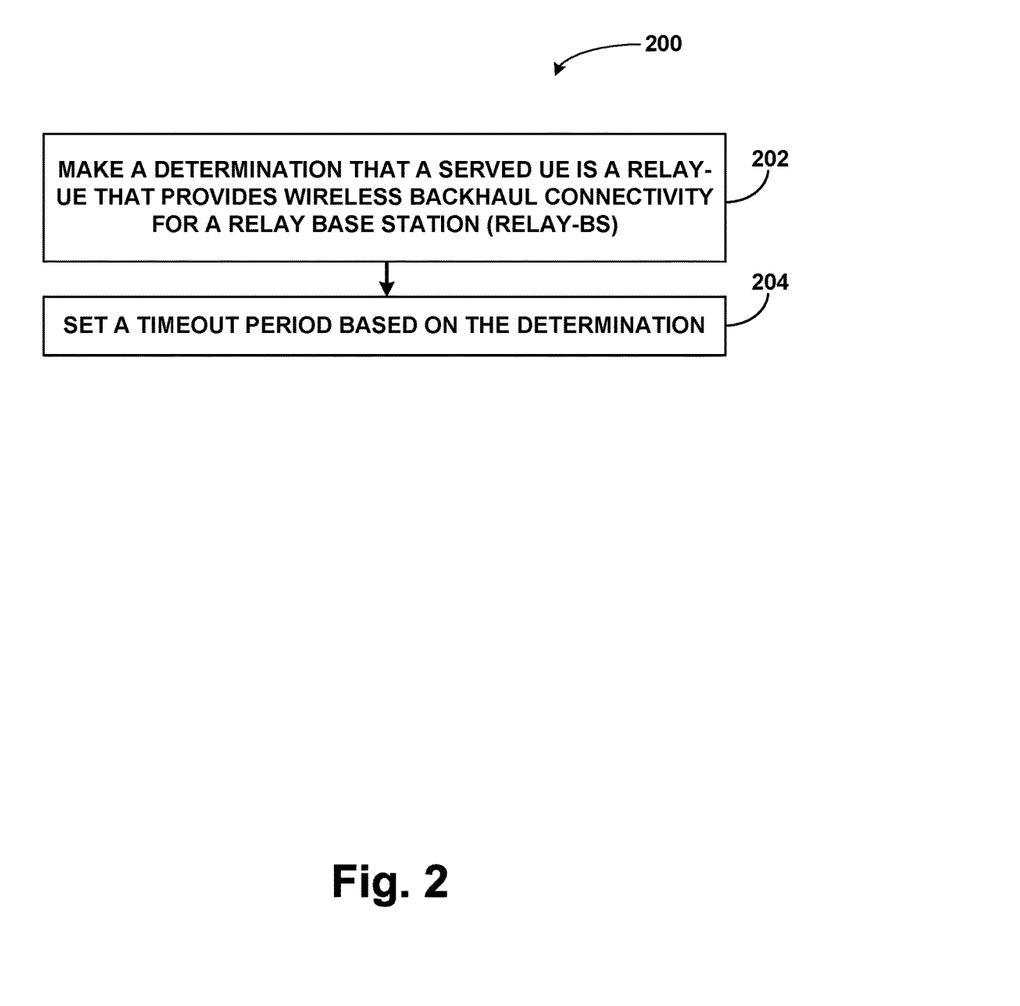
FIG. 2 is a flow chart depicting example operations in accordance with the present disclosure.

FIG. 2 is next a flow chart illustrating a method 200 according to an example embodiment. Illustrative methods, such as method 200, may be carried out in whole or in part by component(s) and/or arrangement(s) in a wireless communication system, such as with one or more of the components of the example BS shown in FIG. 3 and further discussed below, among other possibilities. However, it should be understood that example methods, such as method 200, may be carried out by other entities or combinations of entities as well as in other arrangements, without departing from the scope of the disclosure.

In particular, method 200 is operable in BS having a data storage that defines a buffer. Additionally, that BS is configured (i) to provide an air interface through which the BS serves one or more UEs, (ii) to buffer in the data storage data packets destined to individual UEs of the one or more UEs, and (iii) to apply a buffer timeout process according to which the BS drops at least one data packet from the buffer in response to the at least one data packet being in the buffer for a timeout period.

As shown by block 202 in FIG. 2, method 200 involves the BS making a determination that a relay-UE that provides wireless backhaul connectivity for a relay base station (relay-BS). And at block 204, method 200 then involves the BS setting the timeout period based on the determination. In this way, when the BS then applies the buffer timeout process, the BS drops at least one data packet from the buffer in response to the at least one data packet being in the buffer for the timeout period set based on the determination.

Figure 3:
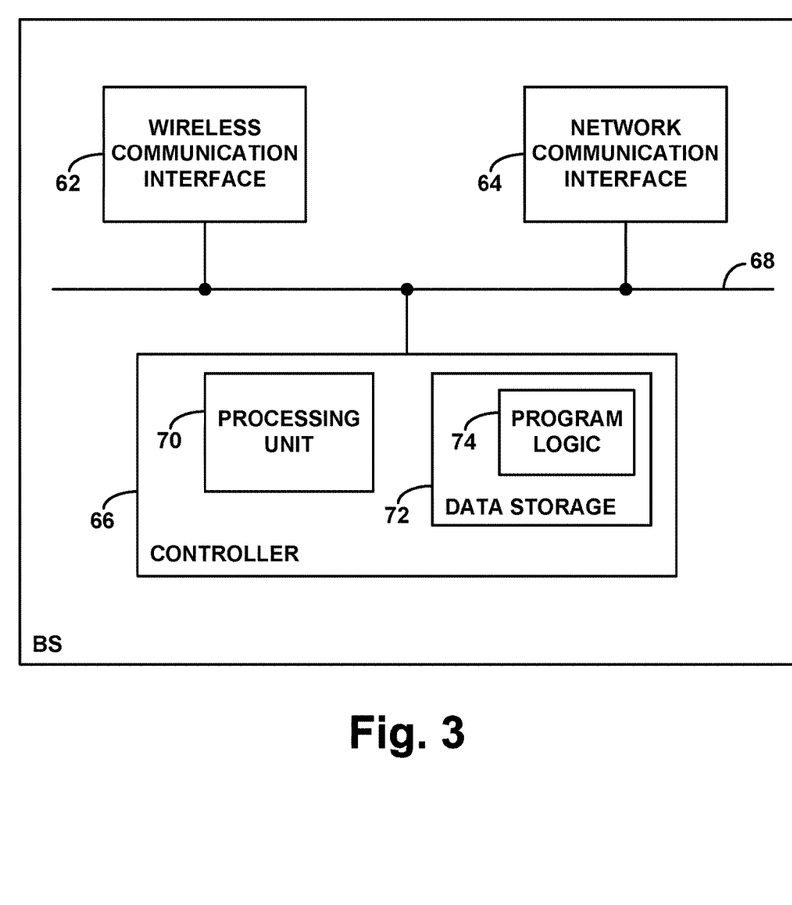
FIG. 3 is a simplified block diagram of an example base station operable in accordance with the present disclosure.

FIG. 3 is next a simplified block diagram of a representative BS, such as a BS including taking the form of a base transceiver station, of an access node, of an access point, of a Node-B, or of an eNodeB, for instance (whether macro, femto or the like), illustrating some of the components that can be included in such an entity configured to operate in accordance with the present disclosure. As shown in FIG. 3, the representative BS includes at least one wireless communication interface 62, at least one network interface 64, and at least one controller 66, all of which may be integrated together in various ways and/or coupled together by a system bus, network, or other connection mechanism 68.

Each wireless communication interface 62 may function to wirelessly serve various entities, such as UEs and an RN as discussed above, communicating over a access link with one or more UEs and over a relay backhaul link with an RN. As such, each wireless communication interface 62 may comprise at least one antenna arrangement (not shown) for the representative BS, which may be tower mounted, and associated components such as at least one power amplifier and at least one cell site modem (not shown), so as to transmit and receive bearer and control data. Each network interface 64 may comprise a wired or wireless interface for communicating with various network infrastructure.

Figure 4:
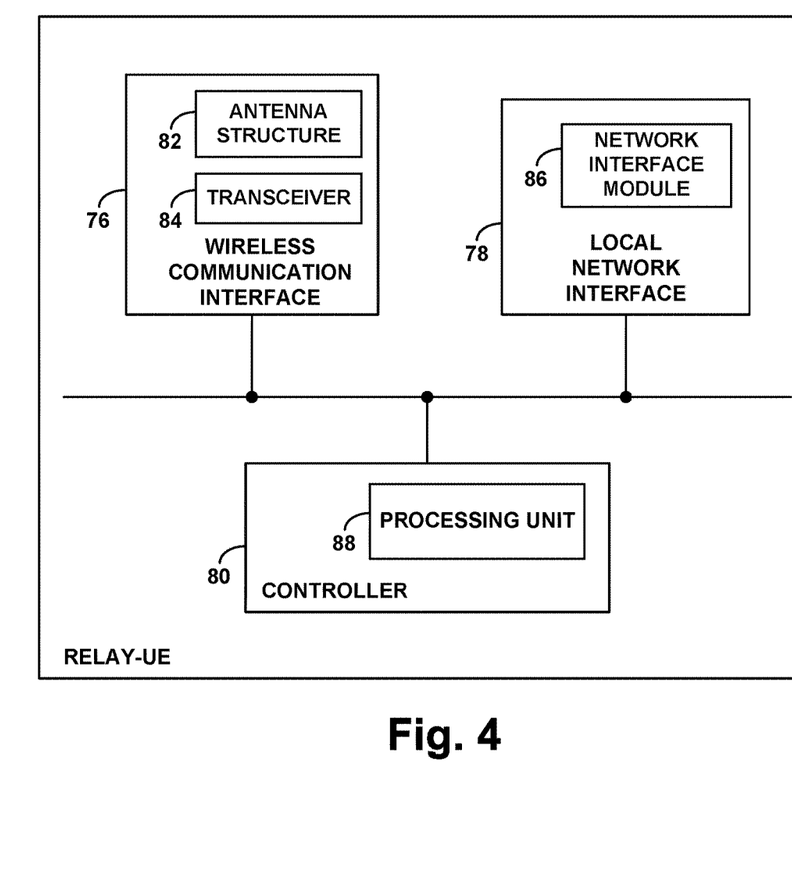
FIG. 4 is a simplified block diagram of an example relay-UE operable in accordance with the present disclosure.

Controller 66 may then function to cause the BS to carry out various functions, such as those discuss herein. As such, controller 66 could take various forms. For instance, as shown, the controller 66 may include a processing unit 70 (e.g., one or more general purpose or special purpose processors) and data storage 72 (e.g., volatile and/or non-volatile storage such as magnetic, optical, flash or other storage) holding program logic 74 (e.g., machine language instructions) executable by the processing unit to carry out the various BS functions. Finally, FIG. 4 is a simplified block diagram of a relay-UE, showing some of the components that such an entity could include. As shown, the relay-UE includes a wireless communication interface 76, a local network interface 78, and a controller 80, any or all of which could be integrated together in various ways. In particular, the wireless communication interface 76 could include an antenna structure 82 and transceiver 84, for communicating over the air interface with a donor base station. The local network interface 78 could include a network interface module (e.g., Ethernet module) 86 for communicating with a relay-BS. And the controller 80 could include a processing unit 88 (e.g., one or more microprocessors or the like) programmed with instructions to carry out various relay-UE operations.

Exemplary embodiments have been described above. It should be understood, however, that variations from these embodiments are possible, while remaining within the true spirit and scope of the invention.

We claim:

1. A method operable in a base station (BS) having a data storage that defines a buffer, wherein the BS is configured (i) to provide an air interface through which the BS serves one or more user equipment devices (UEs), (ii) to buffer in the data storage data packets destined to individual UEs of the one or more UEs, and (iii) to apply a buffer timeout process according to which the BS drops at least one data packet from the buffer in response to the at least one data packet being in the buffer for a timeout period, the method comprising:

making a first determination, by the BS, that a served UE is a relay-UE that provides wireless backhaul connectivity for a relay base station (relay-BS);

determining, by the BS, a count of how many UEs are being served by the relay-BS;

based at least on the determined count, making a second determination, by the BS, of a particular duration by which the timeout period is to be adjusted, wherein the BS is configured to make the second determination based on mapping data that maps (i) each of various counts of UEs being served by the relay-BS with (ii) a respective adjustment to the timeout period; and based on the first and second determinations, adjusting, by the BS, the timeout period by the particular duration, whereby, when the BS then applies the buffer timeout process, the BS is configured to drop at least one data packet from the buffer in response to the at least one data packet being in the buffer for the timeout period adjusted by the particular duration.

2. The method of claim 1, further comprising:

determining, by the BS, an extent of traffic being transmitted from the BS to the relay-UE, wherein making the second determination is further based on the determined extent of traffic being transmitted from the BS to the relay-UE.

3. The method of claim 2, wherein the mapping data is first mapping data, and wherein the BS is configured to make the second determination further based on second mapping data that maps (i) each of various extents of traffic with (ii) a respective adjustment to the timeout period.

4. The method of claim 2, wherein the mapping data is first mapping data, wherein the BS is configured to make the second determination further based on second mapping data that maps (i) a first extent of traffic with a first duration by which the timeout period is to be adjusted and (ii) a second extent of traffic with a second duration by which the timeout period is to be adjusted, wherein the second extent is larger than the first extent, and wherein the second duration is longer than the first duration.

5. The method of claim 1, further comprising:

determining, by the BS, a type of traffic being transmitted from the BS to the relay-UE, wherein making the second determination is further based on the determined type of traffic being transmitted from the BS to the relay-UE.

6. The method of claim 5, wherein the mapping data is first mapping data, and wherein the BS is configured to make the second determination further based on second mapping data that maps (i) each of various types of traffic with (ii) a respective adjustment to the timeout period.

7. The method of claim 5, wherein the determined type of traffic is control signaling traffic, and wherein adjusting the timeout period by the particular duration comprises increasing the timeout period by the particular duration.

8. The method of claim 1, wherein making the first determination comprises:

determining a public land mobile network (PLMN) to which the served UE subscribes; and based on the determined PLMN to which the served UE subscribes, determining that the served UE is a relay-UE.

9. The method of claim 1, wherein adjusting the timeout period by the particular duration comprises increasing the timeout period by the particular duration.

10. The method of claim 1, wherein adjusting the timeout period by the particular duration comprises:

based on the first and second determinations, adjusting the timeout period by the particular duration only for data packets destined to the relay-UE, whereby, when the BS then applies the buffer timeout process, the BS is configured to drop at least one data packet destined to the relay-UE from the buffer in response to the at least one data packet destined to the relay-UE being in the buffer for the timeout period adjusted by the particular duration.

11. The method of claim 1,
wherein the mapping data maps (i) a first count of UEs being served by the relay-BS with a first duration by which the timeout period is to be adjusted and (ii) a second count of UEs being served by the relay-BS with a second duration by which the timeout period is to be adjusted,
wherein the second count is higher than the first count,
wherein the second duration is longer than the first duration, and
wherein adjusting the timeout period by the particular duration comprises adjusting the timeout period by the first duration if the determined count is the first count or adjusting the timeout period by the second duration if the determined count is the second count.

12. A base station (BS) comprising:
an antenna structure configured to provide an air interface through which the BS serves one or more user equipment devices (UEs);
a data storage that defines a buffer; and
a controller configured (i) to buffer in the data storage data packets destined to individual UEs of the one or more UEs and (ii) to apply a buffer timeout process according to which the controller drops at least one data packet from the buffer in response to the at least one data packet being in the buffer for a timeout period, wherein the controller is further configured to:
make a determination that a served UE is a relay-UE that provides wireless backhaul connectivity for a relay base station (relay-BS);
determine that a type of traffic being transmitted from the BS to the relay-UE is control signaling traffic; and
increase a duration of the timeout period based on the determination and on the determined type of traffic, whereby, when the controller then applies the buffer timeout process, the controller is configured to drop at least one data packet from the buffer in response to the at least one data packet being in the buffer for the increased timeout period.

13. The BS of claim 12, wherein the controller being configured to increase a duration the timeout period based on the determination and on the determined type of traffic comprises the controller being configured to:
based on the determination and on the determined type of traffic, increase the duration of the timeout period only for data packets destined to the relay-UE, whereby, when the controller then applies the buffer timeout process, the controller is configured to drop at least one data packet destined to the relay-UE from the buffer in response to the at least one data packet destined to the relay-UE being in the buffer for the increased timeout period.

14. A non-transitory computer readable medium having stored thereon instructions executable by a processor to cause a base station (BS) to perform operations, the BS having a data storage that defines a buffer and the BS being configured (i) to provide an air interface through which the BS serves one or more user equipment devices (UEs), (ii) to buffer in the data storage data packets destined to individual UEs of the one or more UEs, and (iii) to apply a buffer timeout process according to which the BS drops at least one data packet from the buffer in response to the at least one data packet being in the buffer for a timeout period, the operations comprising:
making a determination that a served UE is a relay-UE that provides wireless backhaul connectivity for a relay base station (relay-BS);
determining a count of how many UEs are being served by the relay-BS; and
adjusting the timeout period based on the determination and on the determined count of UEs, wherein the BS is configured to refer to mapping data that maps (i) a first count of UEs being served by the relay-BS with a first duration by which the timeout period is to be adjusted and (ii) a second count of UEs being served by the relay-BS with a second duration by which the timeout period is to be adjusted, and wherein the BS is configured to, in accordance with the mapping data, adjust the timeout period by the first duration if the determined count is the first count or adjust the timeout period by the second duration if the determined count is the second count, whereby, when the BS then applies the buffer timeout process, the BS is configured to drop at least one data packet from the buffer in response to the at least one data packet being in the buffer for the timeout period set adjusted based on the determination and on the determined count of UEs.

15. The non-transitory computer readable medium of claim 14,
wherein adjusting the timeout period based on the determination and on the determined count of UEs comprises:
based on the determination and on the determined count of UEs, adjusting the timeout period only for data packets destined to the relay-UE, whereby, when the BS then applies the buffer timeout process, the BS is configured to drop at least one data packet destined to the relay-UE from the buffer in response to the at least one data packet destined to the relay-UE being in the buffer for the timeout period adjusted based on the determination and on the determined count of UEs.

* * * * *